(12) United States Patent
Lechtenboehmer et al.

(10) Patent No.: US 7,441,575 B2
(45) Date of Patent: *Oct. 28, 2008

(54) TIRE WITH COMPONENT HAVING NANOZEOLITE

(75) Inventors: Annette Lechtenboehmer, Ettelbruck (LU); Giorgio Agostini, Colmar-Berg (LU); Filomeno Gennaro Corvasce, Mertzig (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 122 days.

This patent is subject to a terminal disclaimer.

(21) Appl. No.: 11/243,867

(22) Filed: Oct. 5, 2005

(65) Prior Publication Data

US 2007/0074800 A1 Apr. 5, 2007

(51) Int. Cl.
  *B60C 17/00* (2006.01)
  *B60C 11/00* (2006.01)
(52) U.S. Cl. .................... 152/516; 152/517; 152/209.8
(58) Field of Classification Search ............. None
  See application file for complete search history.

(56) References Cited

U.S. PATENT DOCUMENTS

| | | | |
|---|---|---|---|
| 3,245,946 A | 4/1966 | O'Connor et al. ......... 260/41 |
| 4,203,481 A * | 5/1980 | Ranik, Jr. ................ 152/517 |
| 5,704,556 A | 1/1998 | McLaughlin ............. 241/21 |
| 6,273,163 B1 | 8/2001 | Materne et al. .......... 152/548 |
| 6,306,949 B1 | 10/2001 | Materne et al. .......... 524/495 |
| 6,548,439 B2 | 4/2003 | Wu et al. ................. 502/64 |
| 6,669,591 B1 | 12/2003 | Brinkman et al. ........ 474/264 |
| 6,699,921 B2 * | 3/2004 | Ikeda ...................... 524/236 |
| 6,780,805 B2 | 8/2004 | Faber et al. .............. 502/66 |
| 2003/0015272 A1 | 1/2003 | Teratani et al. ........... 152/406 |
| 2003/0174994 A1 | 9/2003 | Garito et al. .............. 385/129 |
| 2004/0047803 A1 | 3/2004 | Valtchev et al. .......... 423/716 |
| 2005/0014854 A1 | 1/2005 | Carcich .................... 521/50 |

FOREIGN PATENT DOCUMENTS

| | | |
|---|---|---|
| EP | 1 298 166 A1 | 4/2003 |
| JP | 04271902 * | 9/1992 |
| JP | 10-324118 | 12/1998 |
| JP | 11-246703 * | 9/1999 |
| JP | 2000-44732 | 2/2000 |
| JP | 2003-41058 | 2/2003 |
| WO | WO 2004/056915 A1 | 7/2004 |
| WO | WO 2005/058465 A2 | 6/2005 |

OTHER PUBLICATIONS

"Experimental verification of a predicted negative thermal expansivity of crystalline zeolites", Journal of Physics: Condensation and Matter, vol. 5, Jul. 5, 1993, L329-L332.*
"Thermal expansion behavior of zeolites and AlPO4", Journal of Physical Chemistry, vol. 99, 1995, 10609.*
European Search Report.
"Strong Negative Thermal Expansion in Siliceous Faujasite" by Martin P. Attfield and Arthur W. Sleight, published in *Chemical Community*, 1998. pp. 601 and 602.
Brochure entitled *NanoZeolites Tomorrow's Materials for Today's Markets*, NanoScape AG. Published in 2005.
"Variable-Temperature Microcrystal X-ray Diffraction Studies of Negative Thermal Expansion in the Pure Silica Zeolite JFR" by Luis A. Villaescusa, et al., published by the *American Chemical Society*, 2001. pp. 5453 through 5459.

* cited by examiner

*Primary Examiner*—Justin Fischer
(74) *Attorney, Agent, or Firm*—John D. DeLong

(57) ABSTRACT

The present invention is directed to a pneumatic tire having at least one component, the at least component including a rubber composition, the rubber composition including a diene based elastomer and 10 to 100 parts by weight, per 100 parts by weight of elastomer, of a nanozeolite having a particle size of less than 1000 nm and a negative coefficient of thermal expansion over at least part of the temperature range of 0° C. to 200° C.

11 Claims, No Drawings

TIRE WITH COMPONENT HAVING NANOZEOLITE

BACKGROUND OF THE INVENTION

Physical properties of rubber compounds measured at high temperature are typically inferior to those at ambient temperature. For example, tensile properties may show significant degradation after exposure of the rubber compound to elevated temperatures. In a practical application of the rubber compound such as in a pneumatic tire, such loss of physical properties with temperature may be undesirable. It would therefore be useful to have a rubber compound and pneumatic tire showing better retention of physical properties with increasing temperature.

SUMMARY OF THE INVENTION

The present invention is directed to a pneumatic tire comprising at least one component, the at least component comprising a rubber composition, the rubber composition comprising a diene based elastomer and 10 to 100 parts by weight, per 100 parts by weight of elastomer, of a nanozeolite having a particle size of less than 1000 nm and a negative coefficient of thermal expansion over at least part of the temperature range of 0° C. to 200° C.

DETAILED DESCRIPTION OF THE INVENTION

There is disclosed a pneumatic tire comprising at least one component, the at least component comprising a rubber composition, the rubber composition comprising a diene based elastomer and 10 to 100 parts by weight, per 100 parts by weight of elastomer, of a nanozeolite having a particle size of less than 1000 nm and a negative coefficient of thermal expansion over at least part of the temperature range of 0° C. to 200° C.

The term "nanozeolite" as used herein refers to particles of a zeolite with a particle size of less than 1000 nanometers (nm). In one embodiment, the nanozeolite has a particle size of less than 500 nm. In another embodiment, the nanozeolite has a particle size of less than 300 nm. In another embodiment, the nanozeolite has a particle size of less than 100 nm.

In one embodiment, the nanozeolite exhibits a negative coefficient of thermal expansion (NCTE) over at least part of the temperature range of from 0° C. to 200° C. Zeolites exhibiting a negative coefficient of thermal expansion are known, for example, from U.S. Pat. Nos. 6,548,439 and 6,780,805. As disclosed therein, in one embodiment of the present invention the nanozeolite has a silica to alumina molar ratio of at least 300 to 1. In one embodiment, the nanozeolite may comprise at least one of mordenite, ultrastabilized Y (USY), ZSM-5, ZSM-8, ZSM-11, ZSM-12, Hyper Y, beta-zeolites, H-ferrierite, H-offretite, faujasite, X zeolite, type L zeolite, mazzite, EMC-2, and combinations of these, preferably silicalite, and any of the natural zeolites including erionite, clinoptilolite, chanazite and phillipsite. One commercially available zeolite having the requisite high silica to alumina molar ratio is CBV 3002 available from the PQ Corporation.

In one embodiment, the nanozeolite has a coefficient of thermal expansion ranging from $-1 \times 10^{-7}$ to $-100 \times 10^{-7}$ $K^{-1}$ over at least part of the temperature range of from 0° C. to 200° C. In another embodiment, the nanozeolite has a coefficient of thermal expansion ranging from $-10 \times 10^{-7}$ to $-80 \times 10^{-7}$ $K^{-1}$ over at least part of the temperature range of from 0° C. to 200° C. In another embodiment, the nanozeolite has a coefficient of thermal expansion ranging from $-20 \times 10^{-7}$ to $-60 \times 10^{-7}$ $K^{-1}$ over at least part of the temperature range of from 0° C. to 200° C. The coefficient of thermal expansion may be measured following the methods described in Attfield et al., Chem. Commun., 1998, Pages 601 and 602, or Villaescusa et al., J. Am. Chem. Soc. 2001, Vol. 123, Pages 5453 through 5459.

Physical properties of filled rubber compositions are negatively affected by increases in working temperature. For example, tensile properties may be seen to decrease at higher tire working temperatures as compared with ambient temperature. This decrease in properties may in part be due to the thermal expansion of the rubber and fillers in the rubber compounds. Typical fillers such as carbon black and silica used in rubber compositions have positive coefficients of thermal expansion on the order of $10^{-5}$ to $10^{-6}$ $K^{-1}$. Elastomers used in tires have coefficients of thermal expansion on the order of $10^{-4}$ $K^{-1}$. On a relative basis, then, the thermal expansion of typical carbon black and silica fillers is not low enough to compensate for the much greater thermal expansion of the elastomers. Through the use of nanozeolites having negative coefficients of thermal expansion, it has now been found that the overall thermal expansion of the rubber compound in the tire may be reduced, resulting in a lessening of the degradation of physical properties with temperature and better retention of physical properties at high operating temperature.

Suitable nanozeolite particles may be produced by any of the methods as are known in the art. In one embodiment, the nanozeolite may be prepared following the comminution methods of U.S. Pat. No. 5,704,556. In another embodiment, the nanozeolite may be prepared following the methods of U.S. Patent Application Publication No. 2004/0047803, fully incorporated herein by reference.

In one embodiment, the nanozeolite is present in the rubber composition in a concentration ranging from 10 to 100 parts by weight per 100 parts by weight of diene based elastomer (phr). In another embodiment, the nanozeolite is present in the rubber composition in a concentration ranging from 20 to 80 parts by weight per 100 parts by weight of diene based elastomer (phr).

The rubber composition comprising a nanozeolite may be used with rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts*, 2003, 62nd edition, published by the Institute of Petroleum, United Kingdom.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art.

In addition to the nanozeolite, the vulcanizable rubber composition may include from about 10 to about 150 phr of silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

The vulcanizable rubber composition may include from 1 to 100 phr of carbon black, crosslinked particulate polymer gel, ultra high molecular weight polyethylene (UHMWPE) or plasticized starch.

Commonly employed carbon blacks can be used as a conventional filler. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 $cm^3$/100 g.

Other fillers may be used in the rubber composition including, but not limited to, particulate fillers including ultra high molecular weight polyethylene (UHMWPE), particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639.

In one embodiment the rubber composition for use in the tire tread may contain a conventional sulfur containing organosilicon compound. Examples of suitable sulfur containing organosilicon compounds are of the formula:

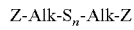     II in which Z is selected from the group consisting of

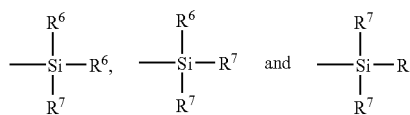

where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) sulfides. In one embodiment, the sulfur containing organosilicon compounds are 3,3'-bis(triethoxysilylpropyl)disulfide and 3,3'-bis(triethoxysilylpropyl)tetrasulfide. Therefore, as to formula II, Z may be

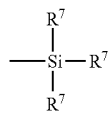

where $R^7$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(\!\!=\!\!O)\!\!-\!\!S\!\!-\!\!CH_2CH_2CH_2Si(OCH_2CH_3)_3$, which is available commercially as NXT™ from GE Silicones.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working vanes as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the compound is a sidewall insert.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In one embodiment, the pneumatic tire may include a sidewall component such as a runflat insert or an apex. Such runflat inserts and apexes are intended to provide support to the sidewall of a runflat tire during a deflation event. In one embodiment, the insert may be incorporated into a runflat tire of the design described in application Ser. No. 10/317,341 filed Dec. 12, 2002, the teachings of which are incorporated herein by reference in their entirety. In another embodiment, the insert may be incorporated into a runflat tire of the design described in application Ser. No. 10/818,724, filed on Apr. 6, 2004, the teachings of which are incorporated herein by reference in their entirety. In still another embodiment of this invention, the insert may be incorporated into a runflat tire disclosed in application Ser. No. 11/017,123, filed Dec. 20, 2004, the teachings of which are incorporated herein by reference in their entirety.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic runflat tire having an equatorial plane (EP), a pair of opposing bead portions, a pair of opposing sidewalls, at least one carcass reinforcing plies, a sidewall insert axially inward of at least one of the carcass reinforcing plies in each sidewall portion, and a belt structure located radially outward of the carcass reinforcing plies, the tire being characterized by the bead portions being symmetrically distanced from the equatorial plane (EP) of the tire, and the tread on each side of the equatorial plane (EP) having different radius of curvature and different widths with the tread curvature on one side of the equatorial plane (EP) defined by continually decreasing radii of curvature, the widths being measured perpendicular to the equatorial plane (EP) to a line tangent to the maximum width of the belt structure the sidewall insert comprising a rubber composition, the rubber composition comprising a diene based elastomer and 10 to 100 parts by weight, per 100 parts by weight of elastomer, of a nanozeolite having a particle size of less than 1000 nm and a negative coefficient of thermal expansion over at least part of the temperature range of 0° C. to 200° C.

2. The pneumatic tire of claim 1, wherein the nanozeolite has a particle size of less than 300 nm.

3. The pneumatic tire of claim 1, wherein the nanozeolite has a particle size of less than 100 nm.

4. The pneumatic tire of claim 1 wherein the nanozeolite has a silica to alumina molar ratio of at least 300 to 1.

5. The pneumatic tire of claim 1 wherein the nanozeolite comprises at least one of mordenite, ultrastabilized Y (USY), ZSM-5, ZSM-8, ZSM-11, ZSM-12, Hyper Y, beta-zeolites, H-ferrierite, H-offretite, faujasite, X zeolite, type L zeolite, mazzite, EMC-2, erionite, clinoptilolite, chanazite and phillipsite.

6. The pneumatic tire of claim 1 wherein the nanozeolite has a coefficient of thermal expansion ranging from $-1 \times 10^{-7}$ to $-100 \times 10^{-7}$ $K^{-1}$ over at least part of the temperature range of from 0° C. to 200° C.

7. The pneumatic tire of claim 1 wherein the nanozeolite has a coefficient of thermal expansion ranging from $-10 \times 10^{-7}$ to $-80 \times 10^{-7}$ $K^{-1}$ over at least part of the temperature range of from 0° C. to 200° C.

8. The pneumatic tire of claim 1 wherein the nanozeolite has a coefficient of thermal expansion ranging from $-20 \times 10^{-7}$ to $-60 \times 10^{-7}$ $K^{-1}$ over at least part of the temperature range of from 0° C. to 200° C.

9. The pneumatic tire of claim 1 wherein the nanozeolite is present in a concentration ranging from 20 to 80 parts by weight per 100 parts by weight of diene based elastomer (phr).

10. The pneumatic tire of claim 1 wherein the nanozeolite has a particle size of less than 500 nm.

11. The pneumatic tire of claim 1 wherein the coefficient of thermal expansion of the rubber composition is less than that of an otherwise identical rubber composition containing no nanozeolite.

* * * * *